(12) United States Patent
Kuan

(10) Patent No.: US 9,436,249 B2
(45) Date of Patent: Sep. 6, 2016

(54) RACK AND POWER CONTROLLING METHOD THEREOF

(71) Applicants: INVENTEC (PUDONG) TECHNOLOGY CORPORATION, Shanghai (CN); INVENTEC CORPORATION, Taipei (TW)

(72) Inventor: Hao-Yen Kuan, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 295 days.

(21) Appl. No.: 14/244,661

(22) Filed: Apr. 3, 2014

(65) Prior Publication Data

US 2014/0359331 A1    Dec. 4, 2014

(30) Foreign Application Priority Data

May 31, 2013 (CN) .......................... 2013 1 0213844

(51) Int. Cl.
  *G06F 1/26*  (2006.01)
  *G06F 1/32*  (2006.01)
  *G06F 11/00*  (2006.01)
  *G06F 1/30*  (2006.01)
  *G06F 11/20*  (2006.01)

(52) U.S. Cl.
  CPC ............. *G06F 1/263* (2013.01); *G06F 1/3203* (2013.01); *G06F 11/00* (2013.01); *G06F 1/26* (2013.01); *G06F 1/30* (2013.01); *G06F 11/2015* (2013.01)

(58) Field of Classification Search
  CPC ...... G06F 1/263; G06F 1/30; G06F 11/2015; G06F 1/26; G06F 1/3203
  USPC ................ 713/300, 320, 321, 322, 323, 324
  See application file for complete search history.

(56) References Cited

U.S. PATENT DOCUMENTS

| 9,223,394 B2 * | 12/2015 | Kuan ..................... G06F 1/3296 |
| 2011/0320849 A1 * | 12/2011 | Cochran ................... G06F 1/26 713/340 |
| 2012/0136498 A1 * | 5/2012 | Chen ....................... G06F 1/189 700/297 |

* cited by examiner

*Primary Examiner* — Michael J Brown
(74) *Attorney, Agent, or Firm* — Huffman Law Group, PC

(57) ABSTRACT

The disclosure provides a rack, including nodes and power supplies, and a power controlling method thereof, including the following steps. Power information of each node is collected to calculate a total power consumption value of the nodes. A power supply enabling demand is calculated according to the total power consumption value and a maximum power supply value of the power supply. State information of each of the power supplies is read to obtain a first sequence of the power supplies. According to the power supply enabling demand and the first sequence, two of the power supplies are enabled and set as a master power supply and a secondary power supply, and the rest of the power supplies are disabled. While the master power supply provides a work voltage to the nodes, the secondary power supply does not supply the work voltage to the nodes.

8 Claims, 3 Drawing Sheets

RACK AND POWER CONTROLLING METHOD THEREOF

CROSS-REFERENCE TO RELATED APPLICATIONS

This non-provisional application claims priority under 35 U.S.C. §119(a) on Patent Application No(s). 201310213844.X filed in China on May 31, 2013, the entire contents of which are hereby incorporated by reference.

BACKGROUND OF THE INVENTION

1. Technical Field of the Invention

The disclosure relates to a power controlling method, and more particularly to a rack and a power controlling method thereof.

2. Description of the Related Art

Nowadays servers are commonly focused on their individual functions and performances and thus work independently. Every server (or called as server node) only and dynamically adjusts its resource consumption according to its situation and requirement to balance its resource consumption and performance.

However, since these server nodes are independent to each other, they cannot cooperate with each other. These server nodes in a data center (or called as a rack) have to work at a similar performance at the same time, thereby causing a lots of unnecessary power consumption. Moreover, since all power supplies are enabled to supply power to the server nodes under the normal operation where not every server node in the server is fully loaded, more unnecessary power consumption is caused.

In order to reduce the power consumption of server nodes, a rack is designed to be capable of adjusting the operation states of power supplies according to the load level of each server node, that is, some power supplies power the server nodes but some power supplies do not. In this case, these power supplies are enabled according to a specific order. Since the power supplies with the lower priorities are enabled if the server nodes with the higher loading require higher power, the power supplies with the higher priorities will be enabled all the time. Therefore, the operation periods of all of the power supplies are not average or are different. The lifespan of the power supplies enabled often may be reduced, and capacitors in the power supplies enabled often may easily become aged to reduce the efficiency of power conversion.

SUMMARY OF THE INVENTION

According to one or more embodiments, the disclosure provides a power controlling method for a rack including a plurality of nodes and a plurality of power supplies. The power controlling method includes the following steps: receiving power information of each of the nodes to calculate a total power consumption value of the nodes; calculating a power supply enabling demand according to the total power consumption value and a maximum power supply value of the power supply; reading state information of each of the power supplies to obtain a first sequence of the power supplies; and enabling at least two of the power supplies according to the power supply enabling demand and the first sequence, setting the enabled power supplies as at least one current master power supply and at least one current secondary power supply, and disabling the rest of the power supplies. While the master power supply provides a work voltage to the nodes, the secondary power supply and the rest of the power supplies do not supply the work voltage to the nodes.

In one embodiment, the power controlling method further includes the following steps: reading the state information of the rest of the power supplies in a preset period to obtain a second sequence of the rest of the power supplies; enabling at least two of the rest of the power supplies according to the power supply enabling demand and the second sequence, and setting the enabled power supplies as at least one new master power supply and at least one new secondary power supply; disabling the at least one current master power supply and the at least one current secondary power supply; determining whether the nodes stop operating; and when the nodes do not stop operating, returning to the step of reading the state information of the rest of the power supplies in the preset period to obtain the second sequence of the rest of the power supplies.

In one embodiment, the power controlling method further includes the following steps: determining whether an operation period of the nodes is equal to the preset period; when the operation period of the nodes is not equal to the preset period, returning the step of determining whether the operation period of the nodes is equal to the preset period; and when the operation period of the nodes is equal to the preset period, returning the step of reading the state information of the rest of the power supplies in the preset period to obtain the second sequence of the rest of the power supplies.

In one embodiment, the at least one current master power supply and a part of the rest of the power supplies are grouped in a first group, and the at least one current secondary power supply and the other part of the rest of the power supplies are grouped in a second group.

In one embodiment, the at least one current master power supply works at a first voltage, the at least one current secondary power supply works at a second voltage, and the first voltage is larger than the second voltage.

According to one or more embodiments, the disclosure provides a rack. The rack includes: a plurality of power supplies for supplying work voltages respectively; a plurality of nodes for providing power information; a rack management controller, coupled with the nodes and the power supplies and configured to receive the power information of each of the nodes to calculate a total power consumption value of the nodes, to calculate a power supply enabling demand according to the total power consumption value and a maximum power supply value of the power supply, and to calculate a first sequence of the power supplies according to the state information of each of the power supplies; and a control unit, coupled with the rack management controller and the power supplies and configured to, according to the power supply enabling demand and the first sequence, generate a plurality of control signals for enabling at least two of the power supplies, setting the enabled power supplies as at least one current master power supply and at least one current secondary power supply, and disabling the rest of the power supplies. While the at least one current master power supply provides at least one work voltage to the nodes, the at least one current secondary power supply and the rest of the power supplies do not supply the at least one work voltage to the nodes.

In one embodiment, the rack management controller reads the state information of each of the rest of the power supplies in a preset period to obtain a second sequence of the rest of the power supplies, and transmits the second sequence to the control unit; according to the power supply enabling demand and the second sequence, the control unit enables at least two of the rest of the power supplies, sets the enabled power supplies as a new master power supply and a new secondary power supply, disables the master power supply and the secondary power supply, and determines whether the nodes stop operating; when the nodes do not stop operating, the rack management controller repeats the reading of the state information of the rest of the power supplies to obtain the second sequence of the rest of the power supplies, and the control unit continues to enable at least one of the rest of the power supplies, set the at least one enabled power supply as the at least one new master power supply, disable the at least one current master power supply and set the at least one disabled master power supply as at least one new secondary power supplies according to the power supply enabling demand and the second sequence until all of the nodes stop operating.

In one embodiment, the rack management controller further determines an operation period of the nodes is equal to the preset period; when the operation period of the nodes is equal to the preset period, the rack management controller continuously reads the state information of each of the rest of the power supplies to obtain the second sequence of the rest of the power supplies and transmits the second sequence to the control unit, and the control unit continuously enables at least one of the rest of the power supplies according to the power supply enabling demand and the second sequence, sets the at least one enabled power supply as a new master power supply, disables the master power supply, and sets the disabled power supply as a new secondary power supply; and when the operation period is not equal to the preset period, the rack management controller continuously determines whether the operation period of the nodes is equal to the preset period, until the operation period of the nodes is equal to the preset period.

In one embodiment, the at least one current master power supply and a part of the rest of the power supplies are grouped in a first group, and the at least one current secondary power supply and the other part of the rest of the power supplies are grouped in a second group.

In one embodiment, the at least one current master power supply works at a first voltage, the at least one current secondary power supply works at a second voltage, and the first voltage is larger than the second voltage.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
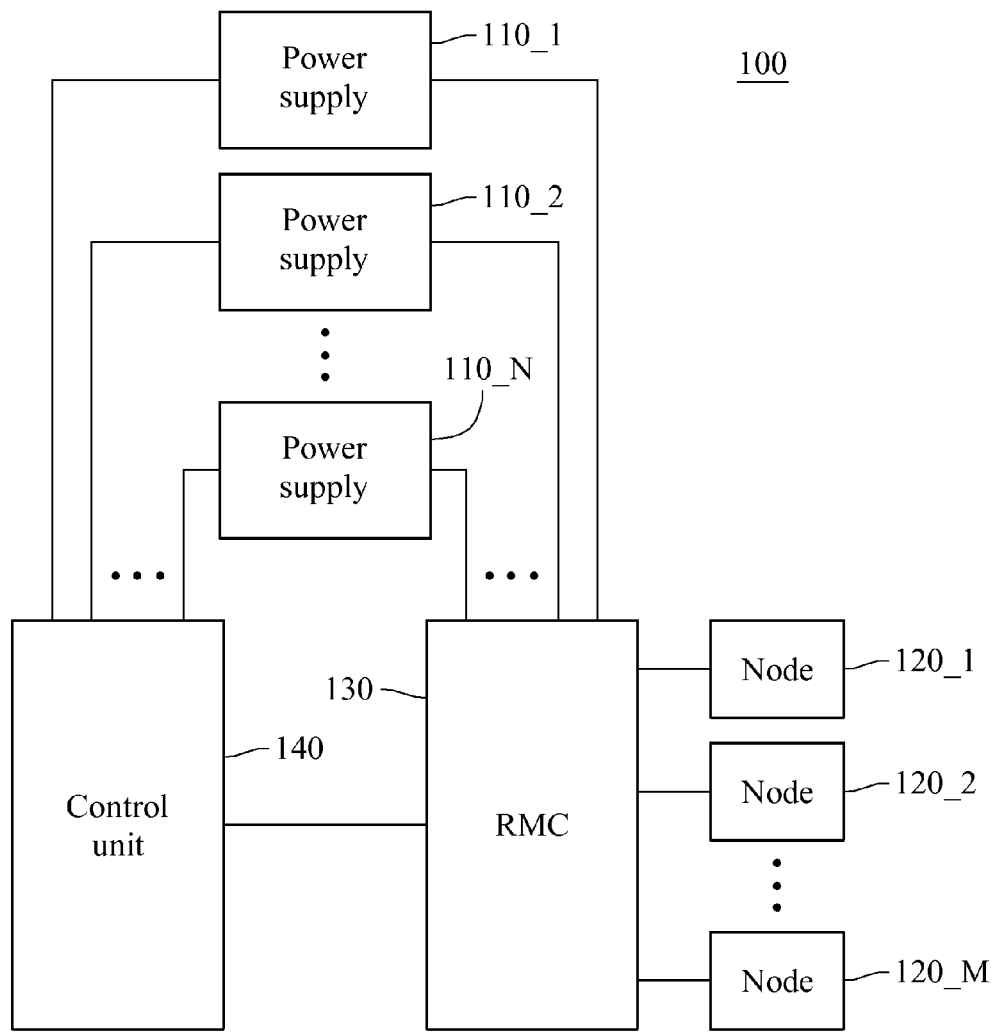
FIG. 1 is a schematic view of a rack in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of a rack in the disclosure. In FIG. 1, a rack 100 includes a plurality of power supplies 110_1 to 110_N, a plurality of nodes 120_1 to 120_M, a rack management controller (RMC) 130 and a control unit 140. N and M are positive integers larger than 1 and are the same or different.

Each of the power supplies 110_1 to 110_N supplies a work voltage for the operation of the nodes 120_1 to 120_M. For example, the maximum power supply values of the power supplies 110_1 to 110_N are the same. For example, the maximum power supply value is 500 W.

The power supplies 110_1 to 110_N may be set as master power supplies, secondary power supplies and the rest of power supplies. In one embodiment, the number of master power supplies may correspond to the number of secondary power supplies. For example, while there are 3 master power supplies, there are 3 secondary power supplies. Moreover, master power supplies and a part of the rest of power supplies 110_1 to 110_N are grouped in a first group, and secondary power supplies and the other part of the rest of power supplies 110_1 to 110_N are grouped in a second group.

Take an example to illustrate master power supplies, secondary power supplies and the rest of power supplies. Assume the power supplies 110_1 to 110_3 are enabled to supply the work voltage to the nodes 120_1 to 120_M. In this case, the power supplies 110_1 to 110_3 are determined as master power supplies. Assume the power supplies 110_4 to 110_6 are enabled but not supply the work voltage to the nodes 120_1 to 120_M. In this case, the power supplies 110_4 to 110_6 are determined as secondary power supplies. Assume the power supplies 110_4 to 110_6 are not enabled and do not supply the work voltage to the nodes 120_1 to 120_M. In this case, the power supplies 110_4 to 110_6 are determined as the rest of power supplies.

In one embodiment, master power supplies may work at a first voltage, secondary power supplies may work at a second voltage, and the rest of power supplies may work at a third voltage. The first voltage is larger than a second voltage, and a second voltage is larger than a third voltage. For example, the first voltage is 12.2V, the second voltage is 11.9V, and the third voltage is 0V.

Each of the nodes 120_1 to 120_M provides its power information. Each of the nodes 120_1 to 120_M includes a baseboard management controller (BMC) and a connection interface. The baseboard management controllers detect the operation states of the nodes 120_1 to 120_M to provide the power information of the nodes 120_1 to 120_M. For example, the power information includes the voltage, current and power of each of the nodes 120_1 to 120_M. For example, the connection interface is an inter integrate circuit (I2C) bus, a serial peripheral interface (SPI) bus, a general purpose input output (GPIO) bus.

The rack management controller 130 couples with the baseboard management controllers of the nodes 120_1 to 120_M through the connection interfaces, to receive the power information (e.g. the voltage, current and power of each of the nodes 120_1 to 120_M), and calculates a total power consumption value of the nodes 120_1 to 120_M according to the power information. Then, the rack management controller 130 calculates a power supply enabling demand according to the total power consumption value and a maximum power supply value of the power supply (i.e. one of the power supplies 110_1 to 110_N). In one embodiment, the power supply enabling demand is obtained by divided the total power consumption value with the maximum power supply value. For example, the maximum power supply value is 500 W.

Take an example, assume the total power consumption value is 1400 W, and the maximum power supply value is 500 W. The rack management controller 130 uses the total power consumption value and the maximum power supply value to obtain a value of 2.8 (1400 W/500 W=2.8). The value of 2.8 means 2.8 power supplies should be enabled. Herein, since the rack management controller 130 will directly round the value of 2.8 up to 3, the power supply enabling demand will be 3. In other words, there are 3 master power supply enabled and 3 secondary power supplies enabled.

Take another example, assume the total power consumption value is 1600 W, and the maximum power supply value is 500 W. The rack management controller 130 uses the total power consumption value and the maximum power supply value to obtain a value of 3.2 (1600 W/500 W=3.2). The value of 3.2 means 3.2 power supplies should be enabled. Herein, since the rack management controller 130 will directly round the value of 3.2 up to 4, the power supply enabling demand will be 4. There are 4 master power supply enabled and 4 secondary power supplies enabled.

In addition, the rack management controller 130 may couple with the power supplies 110_1 to 110_N through an I2C bus, for reading the state information of each of the power supplies 110_1 to 110_N to obtain a first sequence of the power supplies 110_1 to 110_N. Specifically, each of the power supplies 110_1 to 110_N includes a memory for storing its state information such as its identifier and its operation period, so that the rack management controller 130 sorts the power supply 110_1 to 110_M according to the identifier and the operation period of each of the power supplies 110_1 to 110_N to obtain the first sequence. For example, the first sequence represents an order from the minimum operation period to the maximum operation period.

The control unit 140 couples with the rack management controller 130 and the power supplies 110_1 to 110_N, for receiving the power supply enabling demand to generate a plurality of control signals to control the power supplies 110_1 to 110_N. According to the control signals, the control unit 140 enables at least two of the power supplies 110_1 to 110_N and disables the rest of the power supplies 110_1 to 110_N. The at least two enabled power supplies are determined as at least one master power supply and at least one secondary power supply. The at least one master power supply will supply a work voltage to the nodes 120_1 to 120_M, and the at least one secondary power supply and the rest of power supplies 110_1 to 110_N will not supply the work voltage to the nodes 120_1 to 120_M. For example, the control unit 140 is a complex programming logic device (CPLD).

Take an example to illustrate the enabling and disabling of the power supplies 110_1 to 110_N. Assume the rack management controller 130 obtains a power supply enabling demand of 3, and elements of the first sequence from the highest priority to the lowest priority indicate the power supplies 110_1, 110_3, 110_5, 110_2, 110_4 and 110_6. The control unit 140 correspondingly generates the control signals for the power supplies 110_1 to 110_N. The power supplies 110_1, 110_3 and 110_5 are enabled and determined as 3 master power supplies, the power supplies 110_2, 110_4 and 110_6 are enabled and determined as 3 secondary power supplies, and the power supplies 110_7 to 110_N are disabled. Therefore, the power supplies 110_1, 110_3 and 110_5 (i.e. the master power supplies) will supply a work voltage to the nodes 120_1 to 120_M, but the power supplies 110_2, 110_4 and 110_6 (i.e. the secondary power supplies) and the power supplies 110_7 to 110_N (the rest of power supplies 110_1 to 110_N) will not.

Take another example to illustrate the enabling and disabling of the power supplies 110_1 to 110_N. Assume the rack management controller 130 obtains a power supply enabling demand of 2, and elements of the first sequence from the highest priority to the lowest priority indicate the power supplies 110_1, 110_3, 110_2 and 110_4. The control unit 140 correspondingly generates the control signals for the power supplies 110_1 to 110_N. The power supplies 110_1 and 110_3 are enabled and determined as 2 master power supplies, the power supplies 110_2 and 110_4 are enabled and determined as 2 secondary power supplies, and the power supplies 110_5 to 110_N are disabled. Therefore, the power supplies 110_1 and 110_3 (i.e. the master power supplies) will supply a work voltage to the nodes 120_1 to 120_M, but the power supplies 110_2 and 110_4 (i.e. the secondary power supplies) and the power supplies 110_5 to 110_N (i.e. the rest of power supplies 110_1 to 110_N) will not.

In this way, the rack 100 in the disclosure may be prevented from often using certain power supplies and from the aging of components in the power supply and the decrease of the efficiency of power conversion.

After the at least one master power supply (e.g. the power supplies 110_1 and 110_3) has operated (e.g. the power supplies 110_1 and 110_3 supply the work voltage to the nodes 120_1 to 120_M) for a preset period, the rack management controller 130 reads the state information (e.g. an operation period) of the rest of power supplies 110_1 to 110_N. The rack management controller 130 then obtain a second sequence of the rest of power supplies 110_1 to 110_N according to the read state information, and sends the second sequence to the control unit 140. For example, elements of the second sequence from the highest priority to the lowest priority indicate the power supply 110_5, the power supply 110_7, the power supply 110_6, and the power supply 110_8.

Subsequently, according to the power supply enabling demand and the second sequence, the control unit 140 enables at least two of the rest of power supplies 110_1 to 110_N. The at least two enabled power supplies are determined as at least one new master power supply and at least one new secondary power supply to replace the at least one previous master power supply and the at least one previous secondary power supply. That is, the at least one previous master power supply and the at least one previous secondary power supply are disabled. For example, the power supplies 110_5 and 110_7 are enabled and determined as 2 new master power supplies to replace the power supplies 110_1 and 110_3, and the power supplies 110_6 and 110_8 are enabled and determined as 2 secondary power supplies to replace the power supplies 110_2 and 110_4. The enabled power supplies 110_5 and 110_7 (i.e. the new master power supplies) will supply the work voltage to the nodes 120_1 to 120_M. Since the power supplies 110_1 to 110_4 and 110_9 to 110_N are not enabled, they will not operate.

In one embodiment, before reading the state information of the rest of power supplies 110_1 to 110_N, the rack management controller 130 may further determine whether the operation period of each of the nodes 120_1 to 120_M is equal to the preset period. Whether to adjust the operation states of the power supplies 110_1 to 110_N is based on the preset period. If the operation period of the nodes 120_1 to 120_M is less than the preset period, the rack management controller 130 will continue to detect the operation period of the nodes 120_1 to 120_M until the operation period is equal to the preset period. If the operation period of the nodes 120_1 to 120_M is equal to the preset period, the rack management controller 130 will read the state information of the rest of power supplies 110_1 to 110_N to obtain the second sequence, and send the second sequence to the control unit 140. For example, the preset period is one week or one month.

Then, the control unit 140 enables at least two of the rest of power supplies 110_1 to 110_N to determine them as at least one new master power supply and at least one new secondary power supply according to the power supply enabling demand and the second sequence, and the control unit 140 also disables the at least one previous master power supply and the at least one previous secondary power supply.

In addition, after the at least one previous master power supply and the at least one previous secondary power supply are disabled, the rack management controller 130 may detect the operation states of the nodes 120_1 to 120_M. That is, the rack management controller 130 may determine whether all of the nodes 120_1 to 120_M stop operating, to decide whether to continuously monitor the operation of the power supplies 110_1 to 110_N and adjust the amount of power supplies enabled.

Take an example to illustrate the detection of the operation states of the nodes 120_1 to 120_M. If all of the nodes 120_1 to 120_M do not stop operating, the rack management controller 130 will continue to detect and determine the operation states of the nodes 120_1 to 120_M and the corresponding operation. If all of the nodes 120_1 to 120_M stop operating (i.e. the rack 100 stops operating), the rack management controller 130 will stop the detection and determination of the operation states of the nodes 120_1 to 120_M. Therefore, by adjusting the operation states of the power supplies 110_1 to 110_N, the rack 100 may be prevented from often using certain power supplies and from the aging of components in the power supply and the decrease of the efficiency of power conversion.

Figure 2:
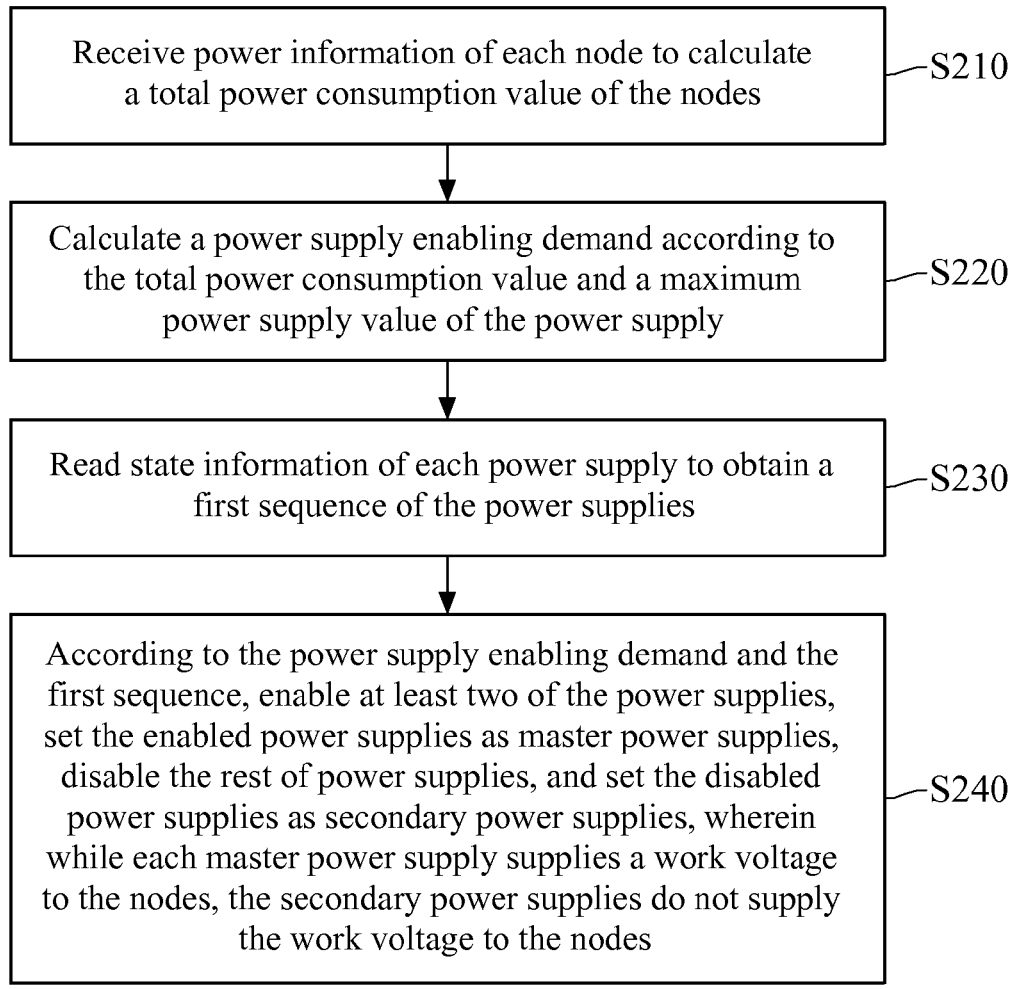
FIG. 2 is a flowchart of a power controlling method for a rack.

In view of the above description about the rack 100, the operation of the rack 100 can be summarized in a power controlling method. FIG. 2 is a flowchart of a power controlling method for a rack. The rack includes a plurality of nodes and a plurality of power supplies. As shown in step S210, receive power information of each node to calculate a total power consumption value of the nodes. As shown in step S220, calculate a power supply enabling demand according to the total power consumption value and a maximum power supply value of the power supply. As shown in step S230, read state information of each power supply to obtain a first sequence of the power supplies. As shown in step S240, according to the power supply enabling demand and the first sequence, enable at least two of the power supplies, set the enabled power supplies as at least one master power supply and at least one secondary power supply, and disable the rest of power supplies 110_1 to 110_N, where while the at least one master power supply supplies at least one work voltage to the nodes, the at least one secondary power supply and the rest of power supplies 110_1 to 110_N do not supply the at least one work voltage to the nodes. For example, the state information is an identifier, an operation period or a combination thereof.

Figure 3:
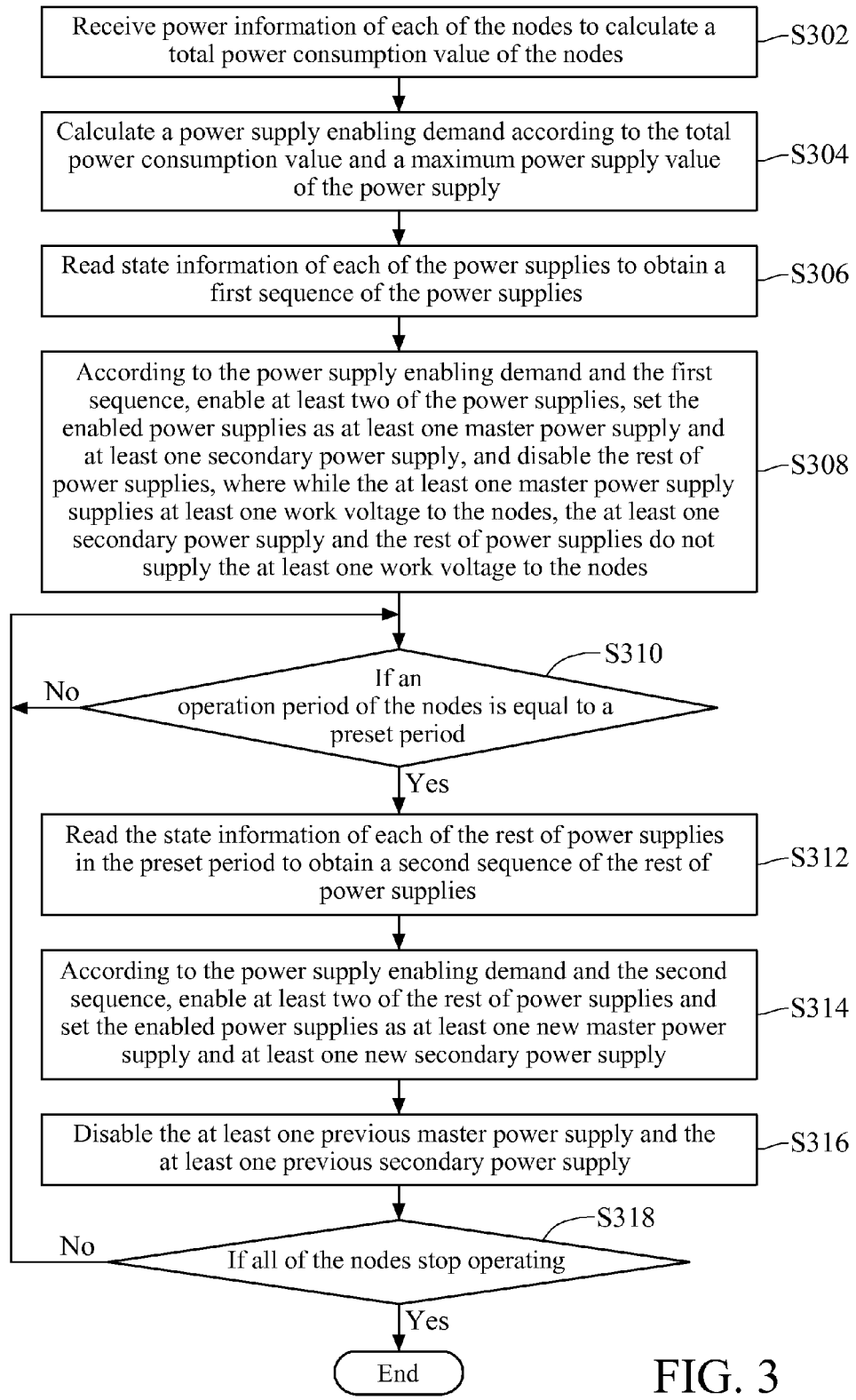
FIG. 3 is a flowchart of a power controlling method for a rack.

FIG. 3 is a flowchart of a power controlling method for a rack. The rack includes a plurality of nodes and a plurality of power supplies. As shown in step S302, receive power information of each of the nodes to calculate a total power consumption value of the nodes. As shown in step S304, calculate a power supply enabling demand according to the total power consumption value and a maximum power supply value of the power supply. As shown in step S306, read state information of each of the power supplies to obtain a first sequence of the power supplies. As shown in step S308, according to the power supply enabling demand and the first sequence, enable at least two of the power supplies, set the enabled power supplies as at least one master power supply and at least one secondary power supply, and disable the rest of power supplies 110_1 to 110_N, where while the at least one master power supply supplies at least one work voltage to the nodes, the at least one secondary power supply and the rest of power supplies 110_1 to 110_N do not supply the at least one work voltage to the nodes.

As shown in step S310, determine whether an operation period of the nodes is equal to a preset period. If the operation period of the nodes is not equal to the preset period, the step S310 will be repeated to continue to determine whether the operation period of the nodes is equal to the preset period. If the operation period of the nodes is equal to the preset period, the state information of each of the rest of power supplies 110_1 to 110_N is read in the preset period to obtain a second sequence of the rest of power supplies 110_1 to 110_N, as shown in step S312. As shown in step S314, according to the power supply enabling demand and the second sequence, enable at least two of the rest of power supplies 110_1 to 110_N and set the enabled power supplies as at least one new master power supply and at least one new secondary power supply.

As shown in step S316, disable the at least one previous master power supply and the at least one previous secondary power supply. As shown in step S318, determine whether all of the nodes stop operating. If all of the nodes do not stop operating, the process returns to the step S310 to repeat the steps S310, S312, S314, S316 and S318. If all of the nodes stop operating, the power controlling method is done. For example, the state information is an identifier, an operation period or a combination thereof.

In view of the above description, the disclosure provide the rack and the power controlling method thereof, where the rack calculates a total power consumption value of nodes according to the power information of the nodes, calculates a power supply enabling demand according to the total power consumption value and a maximum power supply value of one of power supplies, and enables at least one pair of master power supply and secondary power supply in the power supplies according to the power supply enabling demand. While the at least one master power supply supplies a work voltage to the nodes, the at least one secondary power supply and the rest of the power supplies do not supply the work voltage to the nodes. Therefore, the rack may save power, and may still work normally when some power supplies malfunction.

Moreover, during a preset period, the rack reads the state information of each of the rest of the power supplies to obtain a second sequence of the rest of the power supplies, thereby managing the operation states and operation period of the power supplies. In this way, the operation periods of the power supplies may be sufficiently averaged, thereby preventing components in the power supply from being aged very fast and preventing the power supplies from easily malfunctioning.

What is claimed is:

1. A power controlling method for a rack comprising a plurality of nodes and a plurality of power supplies, comprising:

receiving power information of each of the nodes to calculate a total power consumption value of the nodes;

calculating a power supply enabling demand according to the total power consumption value and a maximum power supply value of the power supply;

reading state information of each of the power supplies to obtain a first sequence of the power supplies;

enabling at least two of the power supplies according to the power supply enabling demand and the first sequence, setting the enabled power supplies as at least one current master power supply and at least one current secondary power supply, and disabling the rest of the power supplies;

reading the state information of the rest of the power supplies in a preset period to obtain a second sequence of the rest of the power supplies;

enabling at least two of the rest of the power supplies according to the power supply enabling demand and the second sequence, and setting the enabled power supplies as at least one new master power supply and at least one new secondary power supply;

disabling the at least one current master power supply and the at least one current secondary power supply;

determining whether the nodes stop operating; and when the nodes do not stop operating, returning to the step of reading the state information of the rest of the power supplies in the preset period to obtain the second sequence of the rest of the power supplies, wherein while the at least one current master power supply provides at least one work voltage to the nodes, the at least one current secondary power supply and the rest of the power supplies do not supply the at least one work voltage to the nodes.

2. The power controlling method according to claim 1, further comprising steps of:

determining whether an operation period of the nodes is equal to the preset period;

when the operation period of the nodes is not equal to the preset period, returning the step of determining whether the operation period of the nodes is equal to the preset period; and when the operation period of the nodes is equal to the preset period, returning the step of reading the state information of the rest of the power supplies in the preset period to obtain the second sequence of the rest of the power supplies.

3. The power controlling method according to claim 1, wherein the at least one current master power supply and a part of the rest of the power supplies are grouped in a first group, and the at least one current secondary power supply and the other part of the rest of the power supplies are grouped in a second group.

4. The power controlling method according to claim 1, wherein the at least one current master power supply works at a first voltage, the at least one current secondary power supply works at a second voltage, and the first voltage is larger than the second voltage.

5. A rack, comprising:

a plurality of power supplies for supplying work voltages respectively;

a plurality of nodes for providing power information;

a rack management controller, coupled with the nodes and the power supplies and configured to receive the power information of each of the nodes to calculate a total power consumption value of the nodes, to calculate a power supply enabling demand according to the total power consumption value and a maximum power supply value of the power supply, and to calculate a first sequence of the power supplies according to state information of each of the power supplies; and a control unit, coupled with the rack management controller and the power supplies and configured to, according to the power supply enabling demand and the first sequence, generate a plurality of control signals for enabling at least two of the power supplies, setting the enabled power supplies as at least one current master power supply and at least one current secondary power supply, and disabling the rest of the power supplies, wherein while the at least one current master power supply provides at least one work voltage to the nodes, the at least one current secondary power supply and the rest of the power supplies do not supply the at least one work voltage to the nodes, wherein the rack management controller reads the state information of each of the rest of the power supplies in a preset period to obtain a second sequence of the rest of the power supplies, and transmits the second sequence to the control unit; according to the power supply enabling demand and the second sequence, the control unit enables at least two of the rest of the power supplies, sets the enabled power supplies as at least one new master power supply and at least one new secondary power supply, disables the at least one current master power supply and the at least one current secondary power supply, and determines whether the nodes stop operating; when the nodes do not stop operating, the rack management controller repeats the reading of the state information of the rest of the power supplies to obtain the second sequence of the rest of the power supplies, and the control unit continues to enable at least one of the rest of the power supplies, set the at least one enabled power supply as the at least one new master power supply, disable the at least one current master power supply and set the at least one disabled master power supply as at least one new secondary power supplies according to the power supply enabling demand and the second sequence until all of the nodes stop operating.

6. The rack according to claim 5, wherein before reading the state information of the rest of the power supplies, the rack management controller further determines an operation period of the nodes is equal to the preset period; when the operation period of the nodes is equal to the preset period, the rack management controller continuously reads the state information of each of the rest of the power supplies to obtain the second sequence of the rest of the power supplies and transmits the second sequence to the control unit, and the control unit continuously enables at least one of the rest of the power supplies according to the power supply enabling demand and the second sequence, sets the at least one enabled power supply as a new master power supply, disables the master power supply, and sets the disabled power supply as a new secondary power supply; and when the operation period is not equal to the preset period, the rack management controller continuously determines whether the operation period of the nodes is equal to the preset period, until the operation period of the nodes is equal to the preset period.

7. The rack according to claim 5, wherein the at least one current master power supply and a part of the rest of the power supplies are grouped in a first group, and the at least one current secondary power supply and the other part of the rest of the power supplies are grouped in a second group.

8. The rack according to claim 5, wherein the at least one current master power supply works at a first voltage, the at least one current secondary power supply works at a second voltage, and the first voltage is larger than the second voltage.

* * * * *